United States Patent
Bandera

(10) Patent No.: US 10,118,716 B2
(45) Date of Patent: Nov. 6, 2018

(54) SPIN AND TILT CONTROL OF A MULTI-DEGREE OF FREEDOM ELECTROMAGNETIC MACHINE

(71) Applicant: HONEYWELL INTERNATIONAL INC., Morris Plains, NJ (US)

(72) Inventor: Pablo Bandera, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 303 days.

(21) Appl. No.: 15/207,671

(22) Filed: Jul. 12, 2016

(65) Prior Publication Data

US 2018/0016035 A1 Jan. 18, 2018

(51) Int. Cl.
*B64G 1/28* (2006.01)
*B64G 1/42* (2006.01)
(Continued)

(52) U.S. Cl.
CPC ............ *B64G 1/286* (2013.01); *B64G 1/428* (2013.01); *H02K 21/44* (2013.01); *H02K 41/033* (2013.01);
(Continued)

(58) Field of Classification Search
CPC .. B64G 1/286; B64G 1/428; B64G 2001/245; H02K 41/033; H02K 21/44; H02K 2201/18
See application file for complete search history.

(56) References Cited

U.S. PATENT DOCUMENTS 4,285,552 A * 8/1981 Sutter ................. F16C 32/0444
310/90.5
4,723,735 A * 2/1988 Eisenhaure ............ B64G 1/283
244/165

(Continued)

FOREIGN PATENT DOCUMENTS

| EP | 1480318 A1 | 11/2004 |
| EP | 2955114 A1 | 12/2015 |
| JP | S61203860 A | 9/1986 |

OTHER PUBLICATIONS

Chaojun et al., "Compensation system design of disturbing torques for a magnetically suspended sentive gyroscope with double spherical envelope surfaces", Feb. 2016, Journal of Mechanical Engineering Science, pp. 1-11.*

(Continued)

*Primary Examiner* — Valentina Xavier
(74) *Attorney, Agent, or Firm* — Lorenz & Kopf, LLP

(57) ABSTRACT

A multi-degree-of-freedom electromagnetic machine includes a first structure, a second structure, and a control. The first structure is configured to rotate about a spin axis and about a tilt axis that is perpendicular to the spin axis, and includes a first spin conductor, a second spin conductor, and a tilt conductor, which together form a general shape of a surface. The second structure is disposed adjacent to the first structure and includes a plurality of magnets. The control is configured to controllably supply alternating current (AC) to the first and second spin conductors and direct current (DC) to the tilt conductor, wherein the first structure continuously rotates about the spin axis in response to the AC being supplied to the first and second spin conductors, and rotates about the tilt axis to a tilt position in response to the DC being supplied to the tilt conductor.

14 Claims, 7 Drawing Sheets

(51) Int. Cl.
*H02K 21/44* (2006.01)
*H02K 41/03* (2006.01)
*B64G 1/24* (2006.01)

(52) U.S. Cl.
CPC .... *B64G 2001/245* (2013.01); *H02K 2201/18* (2013.01)

(56) References Cited

U.S. PATENT DOCUMENTS

2012/0024633 A1* 2/2012 Vranish ..................... F03G 3/08
 185/29
2013/0176401 A1* 7/2013 Monari ................ H04N 5/2252
 348/47
2017/0330070 A1* 11/2017 Sengupta ................. G06F 7/48

OTHER PUBLICATIONS

Extended EP Search Report for Application No. 17178238.6-1754 dated Dec. 13, 2017.

* cited by examiner

SPIN AND TILT CONTROL OF A MULTI-DEGREE OF FREEDOM ELECTROMAGNETIC MACHINE

TECHNICAL FIELD

The present invention generally relates to electromagnetic machines, and more particularly relates to systems and methods for spin and tilt control of a multi-degree of freedom electromagnetic machine.

BACKGROUND

As is generally known, control moment gyros (CMGs) are used to control the attitude of a spacecraft, such as a satellite. Presently known CMGs typically include a spin motor, a torque motor, and a momentum wheel (or flywheel). The spin motor rotates the wheel about its centerline axis at some velocity, and the torque motor rotates the wheel through a limited angle about an orthogonal axis. These two motions generate a gyroscopic torque, about a third orthogonal axis, that is proportional to the spin velocity and the tilt angle of the wheel. Typically, the spin motor is relatively small, because only a small torque is required to maintain the spin velocity (once it has reached this velocity), and because the torque motor must move the spin motor along with the wheel.

A fundamental limitation of presently known CMGs is the existence of "singularities" within the momentum envelope of the CMG system. These are specific positions at which the CMG system cannot generate any momentum, due to the alignment of momentum vectors. As may be appreciated, these positions are avoided to prevent the satellite from becoming effectively stuck in a position. One way to mitigate this problem is to mount the CMG in a two-axis gimbal and add a second torque motor. This second motor can then adjust the amplitude of the momentum vector to avoid the singularities. However, this obviously adds undesirable size, weight, and complexity to the system, especially since the second torque motor must work against the gyroscopic torque generated by the first torque motor. Another method is to vary the spin velocity of the wheel while it is being tilted, resulting in what is called a "variable-speed CMG." In practice, however, this is rarely implemented because it requires much higher torques on the spin axis, which results in a larger spin motor, larger toque motor, and larger size and weight overall.

Hence, there is a need for a multi-degree of freedom electromechanical machine that can, for example, implement the functions of a CMG without undue size, weight, and complexity. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree-of-freedom electromagnetic machine includes a first structure, a second structure, and a control. The first structure is configured to rotate about a spin axis and about a tilt axis that is perpendicular to the spin axis. The first structure comprises a first spin conductor, a second spin conductor, and a tilt conductor. The first spin conductor follows a first general trajectory, the second spin conductor follows a second general trajectory that is different from the first general trajectory, and the tilt conductor follows a third general trajectory that is different from the first and second general trajectories. The first spin conductor, the second spin conductor, and the tilt conductor together form a general shape of a surface. The second structure is disposed adjacent to the first structure and includes a plurality of magnets. Each magnet has at least one of its magnetic poles facing the surface. The control is coupled to the first spin conductor, the second spin conductor, and the tilt conductor. The control is configured to controllably supply alternating current (AC) to the first and second spin conductors and direct current (DC) to the tilt conductor, wherein the first structure continuously rotates about the spin axis in response to the AC being supplied to the first and second spin conductors, and rotates about the tilt axis to a tilt position in response to the DC being supplied to the tilt conductor.

In another embodiment, a control moment gyro system includes a spherical structure, a first spin conductor, a second spin conductor, a tilt conductor, a second structure, and a control. The spherical structure is configured to rotate about a spin axis and about a tilt axis that is perpendicular to the spin axis. The spherical structure has a first axis of symmetry, a second axis of symmetry, and a third axis of symmetry, where the first, second, and third axes of symmetry are disposed perpendicular to each other. The first spin conductor is disposed on the spherical structure about the first axis of symmetry, the second spin conductor is disposed on the spherical structure about the second axis of symmetry, and the tilt conductor is disposed on the spherical structure about the third axis of symmetry. The second structure is disposed adjacent to the spherical structure and includes a plurality of magnets. Each magnet has at least one of its magnetic poles facing the spherical structure. The control is coupled to the first spin conductor, the second spin conductor, and the tilt conductor. The control is configured to controllably supply alternating current (AC) to the first and second spin conductors and direct current (DC) to the tilt conductor, wherein the spherical structure continuously rotates about the spin axis in response to the AC being supplied to the first and second spin conductors, and rotates about the tilt axis to a tilt position in response to the DC being supplied to the tilt conductor.

In still another embodiment, a method of controlling a multi-degree-of-freedom electromagnetic machine that includes a first structure and a second structure, wherein the first structure is configured to rotate about a spin axis and about a tilt axis that is perpendicular to the spin axis, and includes a first spin conductor, a second spin conductor, and a tilt conductor, where the first spin conductor follows a first general trajectory, the second spin conductor follows a second general trajectory that is different from the first general trajectory, the tilt conductor follows a third general trajectory that is different from the first and second general trajectories, and where the first spin conductor, the second spin conductor, and the tilt conductor together form a general shape of a surface; and wherein the second structure is disposed adjacent to the first structure and includes a plurality of magnets, each magnet having at least one of its magnetic poles facing the surface, the method includes the steps of: controllably supplying alternating current (AC) to the first and second spin conductors, to thereby cause the first structure to continuously rotate about the spin axis; and controllably supplying direct current (DC) to the tilt conductor, to thereby cause the first structure to rotate about the tilt axis to a tilt position.

Furthermore, other desirable features and characteristics of the multi-degree of freedom electromechanical machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, it is noted that the multi-degree of freedom machine disclosed herein is, for ease of explanation and illustration, generally described as operating as a motor. Persons of ordinary skill in the art will appreciate, however, that the disclosed machine may also be operated as a generator by moving the second structure with an external force and inducing currents in the conductors, or as a sensor (e.g., a rate sensor from generated back EMF), or numerous other devices. It should also be noted that although some of the conductors may be depicted as curved, this is done merely to convey a three-dimensional (3D) spherical shape.

Figure 1:
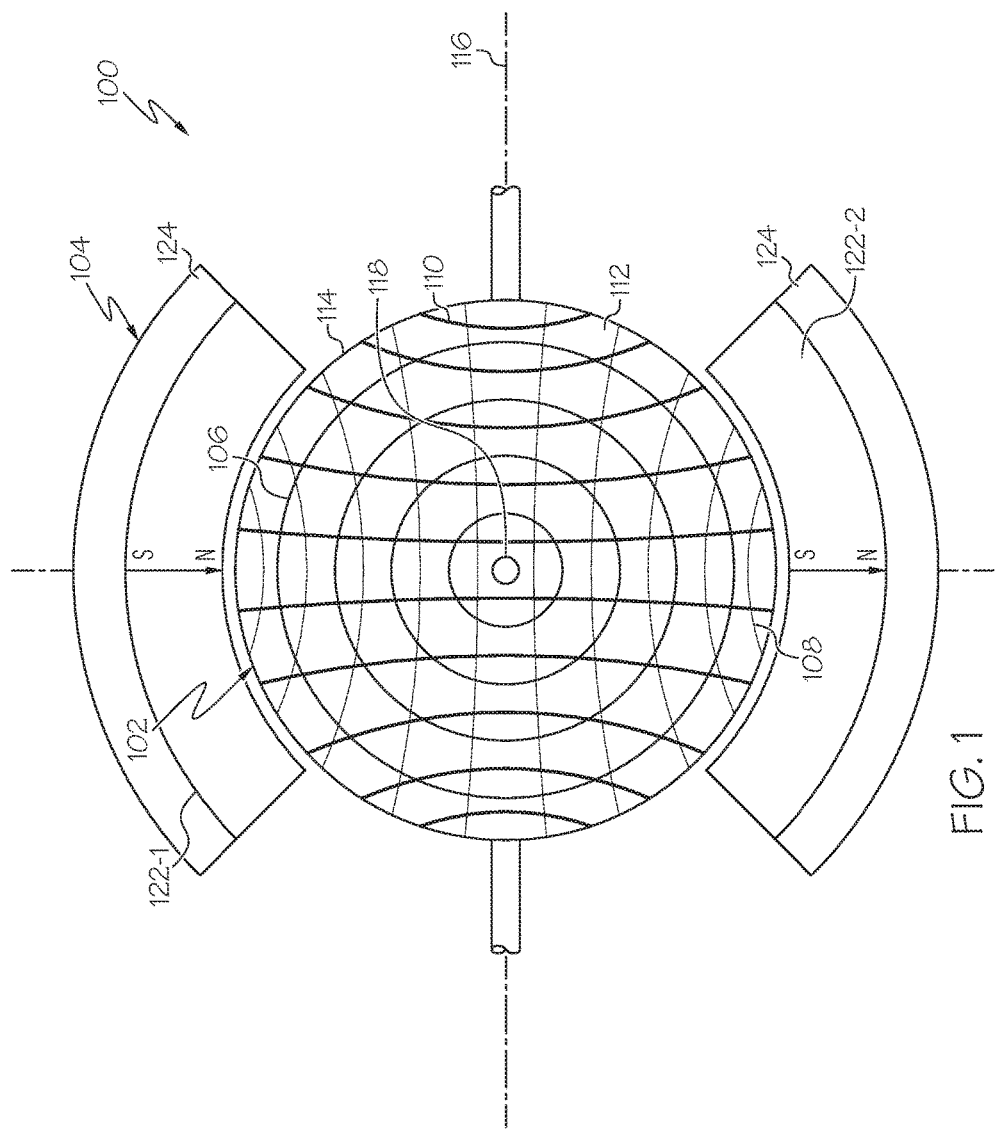
FIG. 1 depicts a simplified cross section view of one example embodiment of a multi-degree of freedom electromagnetic machine.

With reference now to FIG. 1, a simplified cross section view of one embodiment of a multi-degree of freedom electromagnetic machine 100 is depicted, and includes a first structure 102 and a second structure 104. The first structure 102 includes a first spin conductor 106, a second spin conductor 108, and a tilt conductor 110. It will be appreciated that the conductors 106, 108, 110 are each formed of any one of numerous types and shapes of electrically conductive materials, and may be implemented using one or a plurality of these conductive materials. It will additionally be appreciated that the conductors 106, 108, 110 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

Figure 2:
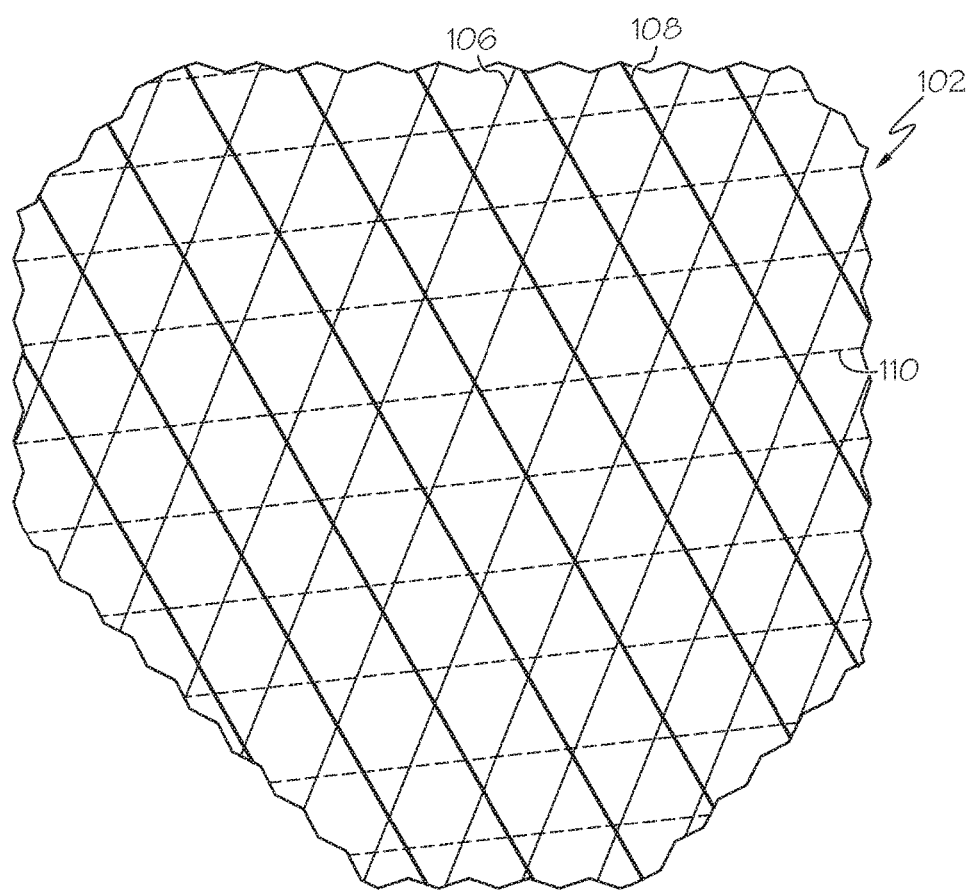
FIG. 2 depicts a simplified representation of a portion of another embodiment of a multi-degree-of-freedom electromagnetic machine.

Regardless of the number, configuration, implementation, or type of materials used, the conductors 106, 108, 110 are disposed such that each follows a different general trajectory. In particular, it is seen that the first spin conductor 106 follows a first general trajectory, the second spin conductor 108 follows a second general trajectory that is different from the first general trajectory, and the tilt conductor 110 follows a third general trajectory that is different from the first and second general trajectories. In the embodiment depicted in FIG. 1, the trajectories are orthogonal to each other. It will be appreciated, however, that in some embodiments, such as the one depicted in FIG. 2, two or all three of the trajectories may be disposed at equal or non-equal arbitrary and non-orthogonal angles relative to each other angles.

Before proceeding further, it is noted that the term "trajectory(ies)," as used herein, means the geometric path traced by a conductor over a predefined length that is designed to contribute to the generation of a Lorentz force (described further below). For example, in some embodiments there may be some conductive lengths that may follow a trajectory to, for example, a power supply. These lengths, however, do not contribute to the Lorentz force, and likely do not contribute to the general shape of the surface. It is additionally noted that the conductors 106, 108, 110 may be wound manually with wires, or may be printed onto a flexible or spherical surface using known printing methods. Moreover, each conductor 106, 108, 110 may have different characteristics. For example, the conductors 106, 108, 110 may differ from each other in size, number of turns, and resistance, and may also be machined or formed as a solid piece, just to name a few characteristics. Doing so allows one to relatively easily and independently tailor each axis to have different performance characteristics, if needed or desired.

Returning to the description, the first, second, and third trajectories are such that together the conductors 106, 108, 110 form the general shape of a surface. The surface can be formed by simply overlaying the conductors (and securing them, e.g. via adhesive), or may be formed by weaving two or more conductors. In the case of weaving, attention to the effects of the waviness on overall efficiency may need to be considered, as the Lorentz force produced on the conductor is a function of the angle between the magnetic field and the current path. Thus, if the field and the current are not orthogonal to each other, the force is reduced.

Figure 3:
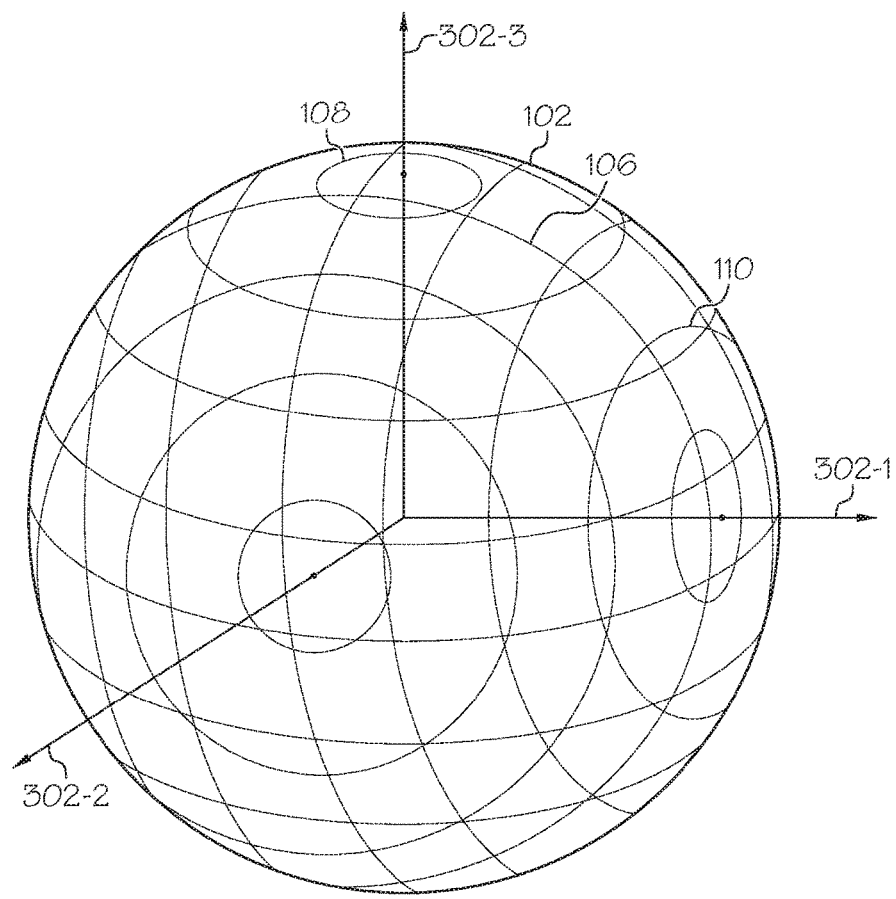
FIG. 3 depicts a perspective view of an embodiment of a spherical structure with orthogonally arranged conductor sets disposed thereon.

The type and shape of the surface may vary, and may be a closed surface, an open surface, a combination of closed and open surfaces, a planar surface, a non-planar surface, or a combination of planar and non-planar surfaces. For example, the surface may be spherical, semispherical, toroidal, cylindrical, cubic, flat, a half-pipe, or various combinations thereof, just to name a few. In the embodiment depicted in FIG. 1, and as is depicted more clearly in FIG. 3, the surface is spherical, and thus has three perpendicularly disposed axes of symmetry 302—a first axis of symmetry 302-1, a second axis of symmetry 302-2, and a third axis of symmetry 302-3. In this embodiment, the first spin conductor 106 is disposed about the first axis of symmetry 302-1, the second spin conductor 108 is disposed about the second axis of symmetry 302-2, and the tilt conductor 110 is disposed about the third axis of symmetry 302-3. It should be noted that a sphere has an infinite number of axes of symmetry. Thus, the first, second, and third axes of symmetry 302-1, 302-2, 302-3, could be any one of these axes of symmetry, so long as all three axes of symmetry are perpendicular to each other.

Returning once again to FIG. 1, it is noted that in some embodiments the first structure 102 comprises only the conductors 106, 108, 110. In other embodiments, however, the first structure 102 further comprises a first body 112. The first body 112, when included, is preferably formed of magnetically permeable material and has an outer surface 114. As is well known, such materials are used to conduct magnetic flux efficiently through the magnetic circuit, and to guide the flux to desired points/locations. Numerous suitable materials are known and include, for example, magnetic steel, iron, and iron alloys (e.g., silicon iron, iron-cobalt, vanadium). At least a portion of the outer surface 114 of the first body 112 preferably has the general shape of the surface, and the conductors 106, 108, 110 are disposed at least adjacent to at least the portion of the outer surface 114 of the first body 112.

Whether or not the first structure 102 comprises only the conductors 106, 108, 110, or the first body 112 and the conductors 106, 108, 110, as FIG. 1 further depicts, the first structure 102 is configured to rotate about a spin axis 116, and to rotate about a tilt axis 118 that is perpendicular to the spin axis 118. It will be appreciated that the spin axis 116 may correspond to any one of the first, second, or third axes of symmetry 302-1, 302-2, 302-3, as may the tilt axis 118, so long as the spin and tilt axes 116, 118 are perpendicular to each other. The manner in which rotation about these perpendicular axes 116, 118 is accomplished will be described further below. First, however, the second structure will be described.

The second structure 104 is disposed adjacent to the first structure 102 and includes at least a plurality of magnets 122 (e.g., a first magnet 122-1 and a second magnet 122-2). The second structure 104 is mounted against rotation and, at least in the depicted embodiment, additionally includes one or more mount structures 124 (two are depicted). The mount structure 124, when included, preferably comprises a magnetically permeable material such as, for example, iron or an iron alloy. In the depicted embodiment, each magnet 122 extends inwardly from an inner surface of the mount structure 124 and is disposed such that at least one of its magnetic poles faces the first structure 102.

Figure 4:
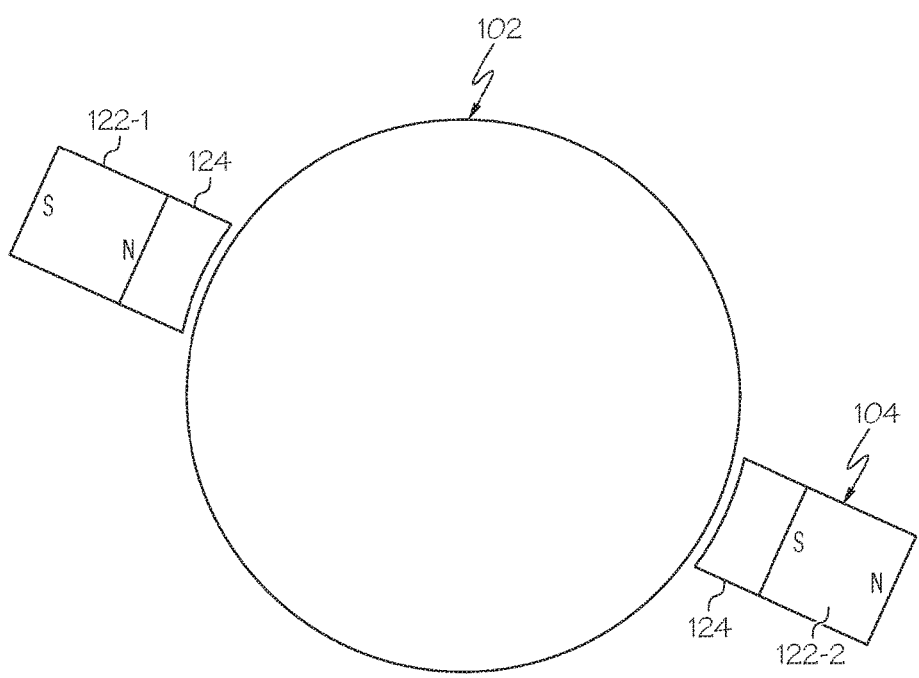
FIGS. 4-6 depict alternative arrangements and configurations of portions of the machine described herein.
Figure 5:
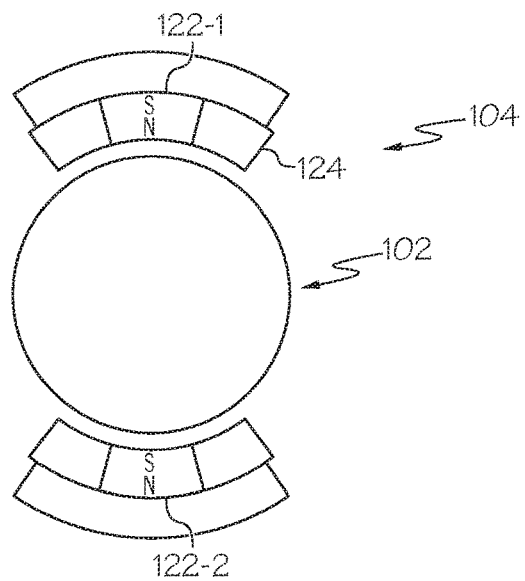
Figure 6:
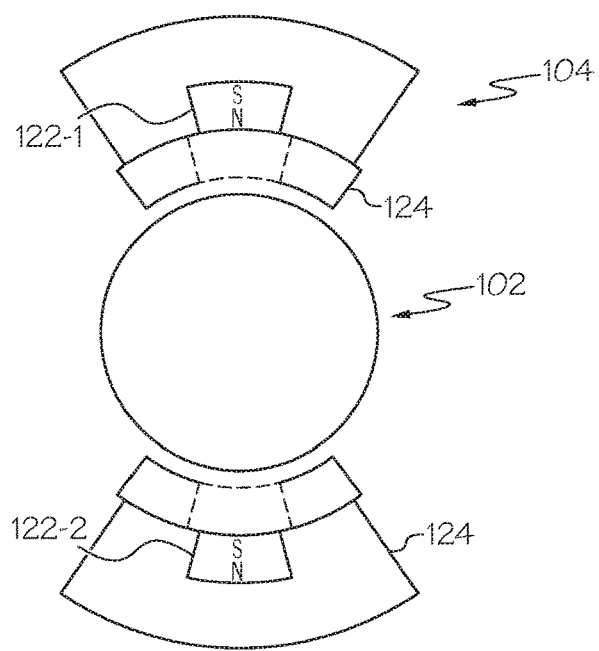

It will be appreciated that the magnets 122 may be variously shaped and dimensioned, and may be variously disposed. For example, in the depicted embodiment the magnets 122 are generally arc-shaped, but in other embodiments the magnets 122 may be semi-spherically shaped, or any one of numerous other shapes if needed or desired. It will additionally be appreciated that the arc length of the magnets 122 may be varied. Moreover, while the portion of the magnets 122 that face the first structure 102 are preferably, for efficiency, contoured similar to the first structures 102, these portions need not be so contoured. In an embodiment depicted in FIG. 4, for example, the magnets 122 may each be disposed on or mounted on the magnetically permeable mount structure 124 that, preferably (though not necessarily), is at least partially contoured similar to the first structure 102 and is disposed adjacent to the first structure 102. And, as FIGS. 5 and 6 depict, the magnets 122 may be integrally formed as part of the mount structure 124 (FIG. 5), or may be formed separately but surrounded by at least a portion of the mount structure (FIG. 6). It is noted that the embodiment depicted in FIG. 6 may optionally include holes or slots (depicted in phantom) to force the flux in the depicted path. These holes or slots may optionally be filled with a suitable material, such as epoxy.

In some embodiments, such as the one depicted in FIG. 1, the magnets 122 are disposed such that the magnetic pole facing the first structure 102 is spaced apart therefrom by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the magnets 122 may be disposed such that the magnetic pole contacts the first structure 102. In such embodiments, the material selection of the contacting surfaces is chosen in consideration of wear and frictional losses, as is known in the art.

It will additionally be appreciated that the magnets 122 may be variously implemented. For example, the magnets may be implemented as permanent magnets or as electromagnets. If implemented as permanent magnets, each magnet 122 may be implemented as a Halbach array. Some non-limiting examples of sources of suitable permanent magnets include Electron Energy Corporation (Landisville, Pa.), Arnold Magnetic Technologies (Rochester, N.Y.), Dexter Magnetic Technologies (Elk Grove Village, Ill.), and Dura Magnetics (Sylvania, Ohio).

Regardless of its shape, dimension, configuration, and implementation, each magnet 122 emanates a magnetic field, and each is preferably arranged such that the polarity of the first magnet 122-1 relative to the first structure 102 is opposite to the polarity of the second magnet 122-2. For example, in the embodiment depicted in FIG. 1, the north pole (N) of the first magnet 122-1 is disposed closer to the first structure 102, whereas the south pole (S) of the second magnet 122-2 is disposed closer to the first structure 102.

The configuration of the conductors 106, 108, 110 and the magnets 122 is such that magnetic flux travels from the one magnet (e.g., the first magnet 122-1) into the first structure 102 on one side and back out on the other side to the other magnet (e.g., the second magnet 122-2). The magnetic flux travels through the conductors 106, 108, 110, and the magnetically permeable mount structure 124 provides the return path for the magnetic flux. As may be appreciated, when an electrical current is supplied to one or more of the conductors 106, 108, 110, the above-mentioned Lorentz force is generated between the energized conductor(s) 106, 108, 110 and the magnets 122, which in turn generates in a torque about one or more of the axes of symmetry 302. The direction of the generated torque, as may also by appreciated, is based on the direction of the current flow in the conductor(s) 106, 108, 110.

Figure 7:
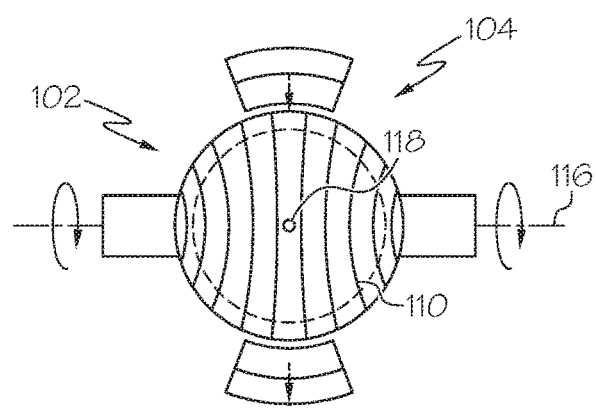
FIGS. 7-9 depict the multi-degree of freedom electromagnetic machine implementing the function of a control moment gyro.
Figure 8:
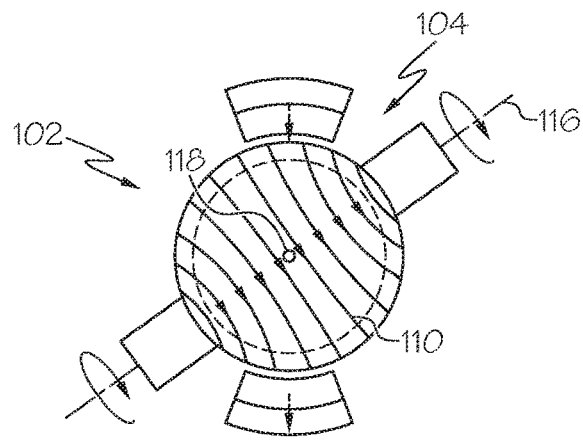
Figure 9:
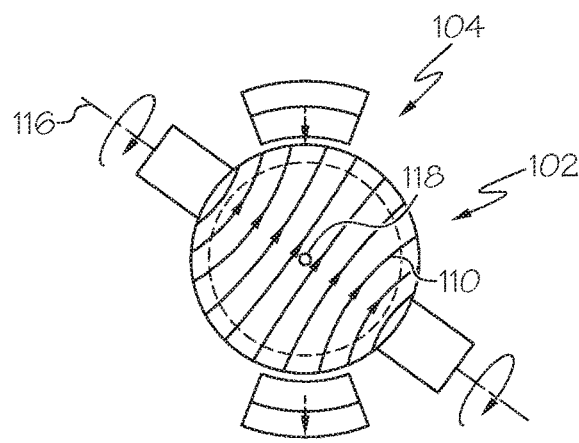

Because, as previously mentioned, the second structure 104 is fixedly mounted, the torque that is generated will cause the first structure 102 to move relative to the second structure 104. The movement of the first structure 102 may be controlled by controlling the magnitudes and directions of the currents in the conductors 106, 108, 110. For example, the first structure 102 can be made to continuously rotate about the spin axis 116, and to simultaneously tilt to a position about the tilt axis 118. This capability is depicted in FIGS. 7-9. In particular, in each of FIGS. 7-9, the first and second spin conductors 106, 108 are energized to cause the first structure 102 to continuously rotate about the spin axis 116. To do so, the first spin conductor 106 is energized with a first alternating electrical current 702 and the second spin conductor 108 is energized with a second alternating electrical current 704, where the first and second alternating currents 702, 704 are equal in amplitude and are 90-degrees out of phase. It will be appreciated that the rate and direction of rotation about the spin axis 116 may be controlled by controlling the frequency of the first and second alternating electrical currents 702, 704.

Now, in FIG. 7, the tilt conductor 110 is either not energized or is energized with very low magnitude direct current such that a force sufficient to cause rotation is not generated. As a result, the first structure 102 does not rotate about the tilt axis 118. In FIG. 8, however, the tilt conductor 110 is energized with a direct current in a first direction and with a sufficient magnitude to generate a rotational force. As a result, while the first structure 102 continuously rotates about the spin axis 116, it also rotates in a first direction about the tilt axis 118, to a tilt position. In FIG. 9, the tilt conductor 110 is energized with a direct current in a second direction and with a sufficient magnitude to generate a rotational force. As a result, while the first structure 102 continuously rotates about the spin axis 116, it also rotates in a second direction about the tilt axis 118, to another tilt position. As may be appreciated, the tilt angle of the first structure 102 is controlled via the magnitude and direction of the direct current in the tilt conductor 110.

Figure 10:
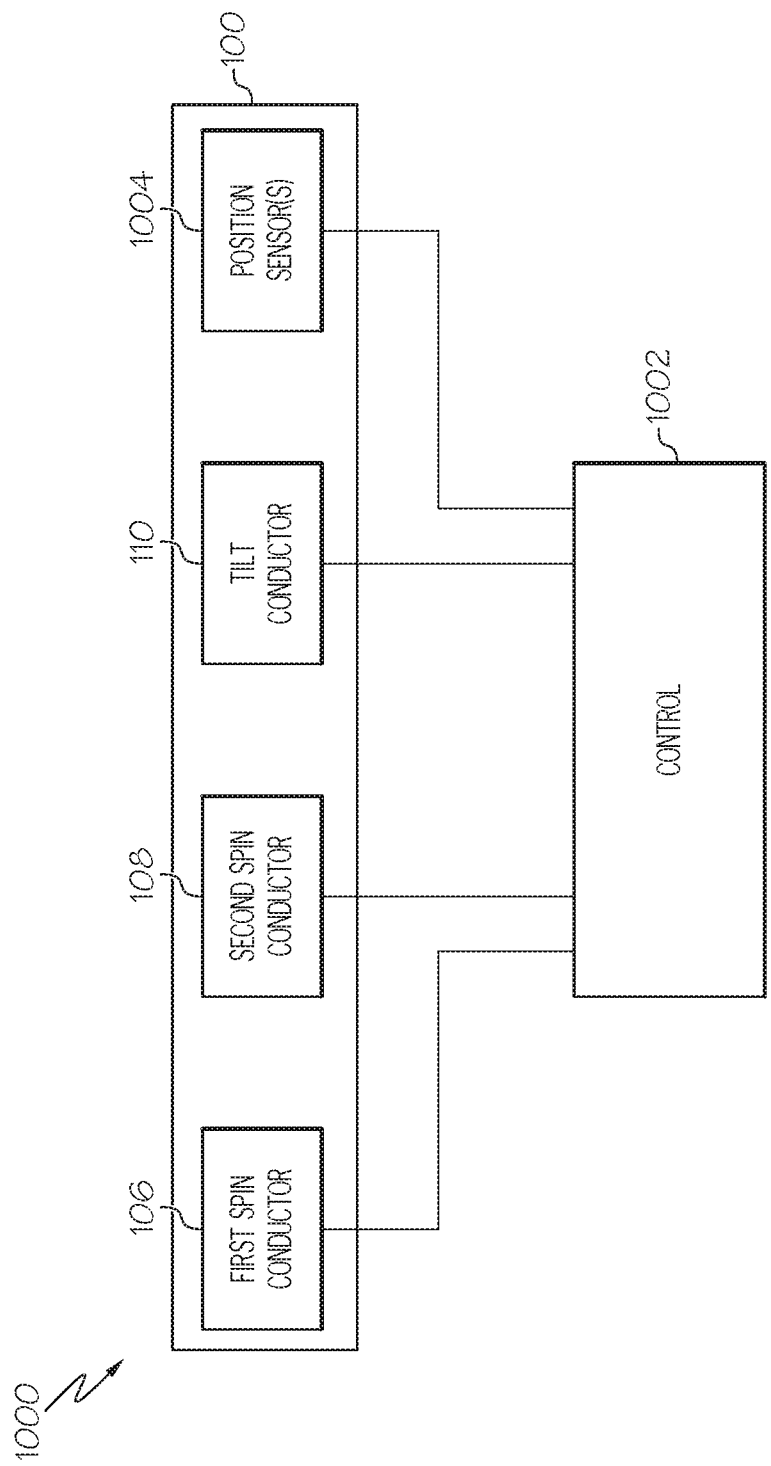
FIG. 10 depicts a functional block diagram of a multi-degree of a control system that may be used to control the electromagnetic machine described herein.

Referring now to FIG. 10, a functional block diagram of a multi-degree of freedom actuation control system 1000 that includes the multi-degree of freedom electromechanical machine 100 of FIG. 1 is depicted. As FIG. 10 depicts, the system 1000 includes a control 1002 that is coupled to each of the conductors 106, 108, 110. The control 1002 is configured to control the current magnitudes and directions in each of the conductors 108 to thereby control the spin rate and direction, and the tilt angle, of the first structure 102. The control 1002 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 1002. Some non-limiting examples of suitable control techniques include PWM control and back EMF control.

If the control 1002 implements closed-loop control, then the control system 1000 additionally includes one or more position sensors 1004. The number and type of position sensors 1004 may vary. For example, the system 1000 may include one or more sensors 1004 to independently sense the position of the first structure 102. Such sensors may be implemented using optical sensors, track balls, rotary sensors, or the like. In other embodiments, the sensor 1004 may be implemented using an optical mask that is applied to the surface of the first structure 102, which can then be read by an optical sensor mounted on the inner surface of the second structure 104.

It will be appreciated that data and power may be transmitted to and from the conductors 106, 108, 110 and position sensor(s) 1004 (if included), using any one of numerous techniques. For example, data may be transmitted wirelessly, via flexible conductors, or via miniature slip rings, and power may be transmitted via flexible conductors, miniature slip rings, or provided via a battery. In one particular embodiment, the conductors 106, 108, 110 are connected to the control via a slip ring mechanism.

The multi-degree of freedom machine 100 disclosed herein is relatively smaller, less cumbersome, and more efficient than known devices. It does not include a longitudinal coil that is difficult to wind, and it does not rely on a separate centering torque to implement open-loop position control. It can be used in various devices and systems to implement the functions of multiple actuator components. For example, as described herein, when it is used as a control moment gyro (CMG) for satellite attitude control, the machine 100 can implement the functions of two spin motors and four torque motors.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine, comprising:
    a first structure configured to rotate about a spin axis and about a tilt axis that is perpendicular to the spin axis, the first structure comprising a first spin conductor, a second spin conductor, and a tilt conductor, the first spin conductor following a first general trajectory, the second spin conductor following a second general trajectory that is different from the first general trajectory, the tilt conductor following a third general trajectory that is different from the first and second general trajectories, the first spin conductor, second spin conductor, and tilt conductor together forming a general shape of a surface;
    a second structure disposed adjacent to the first structure and including a plurality of magnets, each magnet having at least one of its magnetic poles facing the surface; and
    a control coupled to the first spin conductor, the second spin conductor, and the tilt conductor, the control configured to controllably supply alternating current (AC) to the first and second spin conductors and direct current (DC) to the tilt conductor,
    wherein the first structure (i) continuously rotates about the spin axis in response to the AC being supplied to the first and second spin conductors, and (ii) rotates about the tilt axis to a tilt position in response to the DC being supplied to the tilt conductor.

2. The machine of claim 1, wherein:
    one or more of the first spin conductor, the second spin conductors, and the tilt conductor comprise a plurality of electrically conductive segments; and
    each of the electrically conductive segments comprises a conductor of predetermined length.

3. The machine of claim 1, wherein one or more of the first spin conductor, the second spin conductors, and the tilt conductor comprise a contiguous conductor.

4. The machine of claim 1, wherein:
    the first structure further comprises a first body formed of magnetically permeable material and having an outer surface, at least a portion of the outer surface having the general shape of the surface; and
    the first spin conductor, the second spin conductors, and the tilt conductor are disposed at least adjacent at least the portion of the outer surface of the first structure.

5. The machine of claim 1, wherein:
    the surface is a sphere; and
    the first, second, and third general trajectories are such that the first spin conductor, the second spin conductors, and the tilt conductor are oriented at predetermined angles relative to each other.

6. The machine of claim 1, wherein the magnetic pole facing the surface is spaced apart from the first structure by a predetermined gap.

7. The machine of claim 1, wherein the magnet is selected from the group consisting of a permanent magnet and an electromagnet.

8. A control moment gyro system, comprising:
    a spherical structure configured to rotate about a spin axis and about a tilt axis that is perpendicular to the spin axis, the spherical structure having a first axis of symmetry, a second axis of symmetry, and a third axis of symmetry, the first, second, and third axes of symmetry disposed perpendicular to each other;
    a first spin conductor disposed on the spherical structure about the first axis of symmetry;
    a second spin conductor disposed on the spherical structure about the second axis of symmetry;
    a tilt conductor disposed on the spherical structure about the third axis of symmetry;
    a second structure disposed adjacent to the spherical structure and including a plurality of magnets, each magnet having at least one of its magnetic poles facing the spherical structure; and
    a control coupled to the first spin conductor, the second spin conductor, and the tilt conductor, the control configured to controllably supply alternating current (AC) to the first and second spin conductors and direct current (DC) to the tilt conductor,
    wherein the spherical structure (i) continuously rotates about the spin axis in response to the AC being supplied to the first and second spin conductors, and (ii) rotates about the tilt axis to a tilt position in response to the DC being supplied to the tilt conductor.

9. The control moment gyro system of claim 8, wherein:
    one or more of the first spin conductor, the second spin conductors, and the tilt conductor comprise a plurality of electrically conductive segments; and
    each of the electrically conductive segments comprises a conductor of predetermined length.

10. The control moment gyro system of claim 8, wherein one or more of the first spin conductor, the second spin conductors, and the tilt conductor comprise a contiguous conductor.

11. The control moment gyro system of claim 8, wherein the spherical structure comprises a magnetically permeable material.

12. The control moment gyro system of claim 8, wherein the magnetic pole of each of the magnets that is facing the spherical structure is spaced apart therefrom by a predetermined gap.

13. The control moment gyro system of claim 8, wherein the magnets are selected from the group consisting of a permanent magnet and an electromagnet.

14. A method of controlling a multi-degree-of-freedom electromagnetic machine that includes a first structure and a second structure, wherein the first structure is configured to rotate about a spin axis and about a tilt axis that is perpendicular to the spin axis, and includes a first spin conductor, a second spin conductor, and a tilt conductor, where the first spin conductor follows a first general trajectory, the second spin conductor follows a second general trajectory that is different from the first general trajectory, the tilt conductor follows a third general trajectory that is different from the first and second general trajectories, and where the first spin conductor, the second spin conductor, and the tilt conductor together form a general shape of a surface; and wherein the second structure is disposed adjacent to the first structure and includes a plurality of magnets, each magnet having at least one of its magnetic poles facing the surface, the method comprising the steps of:

controllably supplying alternating current (AC) to the first and second spin conductors, to thereby cause the first structure to continuously rotate about the spin axis; and controllably supplying direct current (DC) to the tilt conductor, to thereby cause the first structure to rotate about the tilt axis to a tilt position.

* * * * *